Sept. 6, 1932.  J. F. FRESE  1,875,436
BRAKE
Filed Jan. 26, 1931
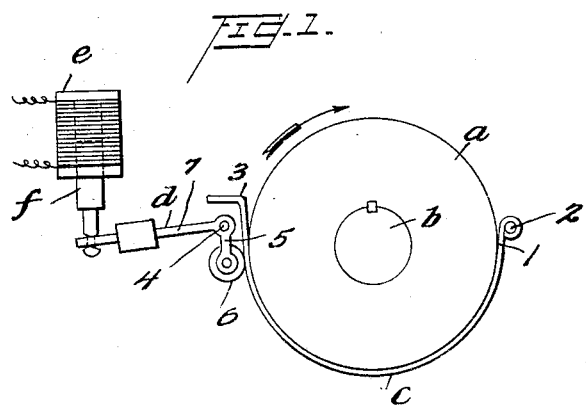
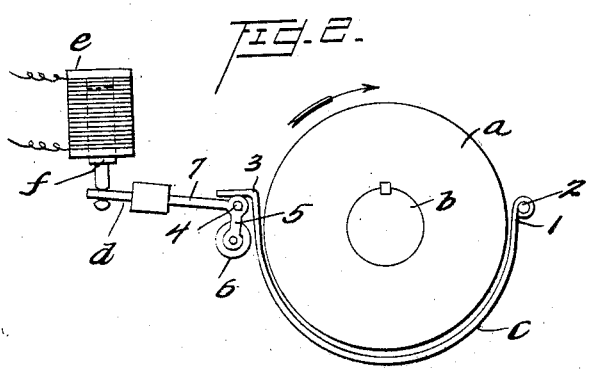
Inventor
Joseph F. Frese
Robert Watson
Attorney Patented Sept. 6, 1932

1,875,436

UNITED STATES PATENT OFFICE

JOSEPH F. FRESE, OF BALTIMORE, MARYLAND

BRAKE

Application filed January 26, 1931. Serial No. 511,380.

This invention relates to a brake adapted particularly for power driven machines, such as printing presses, in which each shaft and brake wheel always turns in one direction only, in the normal running of the machine. Such machines may be equipped with one or several brakes, and these are usually provided with means for taking up the slack in the brake band, due to wear. The operator must adjust these take-up devices, from time to time, in order that the bands may apply the desired braking force to the brake wheels.

The purpose of my invention is to provide a simple brake which requires no manual adjustment to compensate for wear of the brake band, and which applies substantially the same braking force until the brake lining is worn out.

In accordance with the present invention, a flexible, and preferably resilient, brake band is anchored at one of its ends and extends from the point of anchorage partly around the periphery of the brake wheel in the direction of rotation of the wheel, the opposite end of the brake band being free. The band, by its own resilience, or by gravity, constantly tends to swing away from the surface of the brake wheel, but, in setting the brake its free end is pressed against the wheel by a member which is independent of the band. This member is preferably a centrally pivoted lever having a roller on one arm adapted to bear against the band, and the opposite arm of the lever is weighted and causes the roller to press the free end of the band against the brake wheel. With this arrangement, when the heavy arm of the lever is lifted, as by means of a solenoid, the roller is moved away from the brake band and the band falls away from the wheel. When the weighted arm of the lever is allowed to drop, the free end of the brake band is gripped between the roller and the brake wheel and the friction of the latter on the band pulls the band endwise and causes that part of the band between its anchored end and the roller to bear against the wheel. As the lever and roller are not connected to the band, they do not impede its endwise movement, and hence no take-up devices are required, either on the lever or band, to compensate for wear on the band.

In the accompanying drawing,

Fig. 1 is a side view of the brake wheel, band, and operating lever, illustrating the invention, the brake being set; and, Fig. 2 is a similar view, showing the brake released.

Referring to the drawing, *a* indicates a brake wheel, upon a shaft *b* which rotates in the direction of the arrow. A flexible brake band *c* has one of its ends 1 anchored to the fixed support 2, and the opposite end portion 3 of the band is free. As shown, the band extends partly around the brake wheel in the direction of the arrow, from the fixed support. The band is preferably made of spring steel having a brake lining adapted to engage the braking surface of the wheel. A lever *d*, pivoted upon a stationary pin 4, is adapted to rock in the plane of the brake band. As shown, this lever is in the form of a bell crank, and its shorter arm 5, projecting downwardly from the pivotal point and carrying a roller 6, is adapted to bear against the outer surface of the brake band, near its free end. The longer arm 7 of the lever projects horizontally from the pivot 4 and is weighted sufficiently to cause the shorter arm to press the roller firmly against the band. As a means for rocking the lever, I have shown a solenoid *e*, having a core *f* which is connected to the longer arm of the lever. When this solenoid is energized, the lever will be rocked to move the roller away from the band, and when the solenoid is de-energized the lever will rock in the opposite direction and the roller will press the free end of the band against the brake lever.

Normally the parts are in the position shown in Fig. 1. Before the machine is started, the solenoid will be energized, through electrical connections not shown, and the lever will be rocked so as to carry the roller 6 away from the brake wheel and brake band, and the latter will sag away from the wheel, as shown in Fig. 2. When it is desired to set the brake, the solenoid will be de-energized and the weighted arm of the lever will drop downwardly, causing the shorter arm to swing the roller toward the brake wheel and the band will thus become gripped between the roller and the wheel. As the wheel rotates in the direction of the arrow, the friction applied to the band, at the point where it is gripped, causes an endwise movement of the band which brings that part of the brake band which is included between the roller and the anchored end of the band into contact with the braking surface of the wheel. It will be evident that the action will be the same whether the band is new or worn, no hand adjustment being required, since the lever is not connected to the brake band and the latter can move endwise beyond the point of contact with the roller to an extent which will increase gradually as the brake lining wears.

What I claim is:

1. The combination with a member having a cylindrical braking surface and adapted to rotate in a vertical plane in one direction, of a flexible substantially semi-circular brake band anchored at one end and extending around the lower half of said member, a bell crank lever having a weighted arm and a downwardly extending arm, the latter having a roller adapted to normally bear against the free end of the band and hold it against the braking surface and a magnet adapted, when energized, to lift the weighted arm and thereby move the roller away from the band, to release the brake.

2. The combination with a member having a cylindrical braking surface and adapted to rotate in a vertical plane in one direction, of a flexible substantially semi-circular brake band anchored at one end and extending around the lower half of said member and having an outward projection at its free end adapted to rest on a suitable support, a bell crank lever having a roller adapted to normally bear against the band below said projection, and a magnet adapted, when energized, to lift the weighted arm and thereby move the roller away from the band, to release the brake.

In testimony whereof I affix my signature.

JOSEPH F. FRESE.